United States Patent
Mackin et al.

(10) Patent No.: US 8,186,497 B2
(45) Date of Patent: May 29, 2012

(54) UNLOADING CONVEYOR SUSPENSION SYSTEM

(75) Inventors: Ryan Patrick Mackin, Milan, IL (US); Daniel James Burke, Cordova, IL (US); Bruce Alan Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 12/577,814

(22) Filed: Oct. 13, 2009

(65) Prior Publication Data

US 2011/0083411 A1 Apr. 14, 2011

(51) Int. Cl.
*B65G 23/44* (2006.01)

(52) U.S. Cl. ............ 198/312; 198/316.1; 198/317; 198/318

(58) Field of Classification Search .......... 198/312–320; 414/523
See application file for complete search history.

(56) References Cited

U.S. PATENT DOCUMENTS

| | | | | |
|---|---|---|---|---|
| 2,856,062 A | * | 10/1958 | Kling | 198/317 |
| 3,402,805 A | * | 9/1968 | Spellman, Jr. | 198/313 |
| 3,642,041 A | * | 2/1972 | Hamilton et al. | 144/338 |
| 3,682,288 A | * | 8/1972 | Montacie | 198/522 |
| 4,508,213 A | * | 4/1985 | Kelley | 198/813 |
| 5,165,838 A | * | 11/1992 | Kallansrude et al. | 414/471 |
| 6,695,130 B1 | * | 2/2004 | Blaylock et al. | 198/813 |
| 2008/0133095 A1 | | 6/2008 | Erdmann et al. | |

FOREIGN PATENT DOCUMENTS

| | | |
|---|---|---|
| DE | 19802199 A1 | 7/1999 |
| EP | 1151652 A1 | 11/2001 |
| EP | 1927277 A1 | 6/2007 |
| EP | 2135499 A1 | 12/2009 |

OTHER PUBLICATIONS

European Search Report dated Feb. 23, 2011, (5 pages).

* cited by examiner

*Primary Examiner* — Mark A Deuble

(57) ABSTRACT

A suspension system for an unloading conveyor of an agricultural harvester vehicle, has a first support configured to hold the unloading conveyor in a vertical unloading position; a second support configured to hold the unloading conveyor in a horizontal unloading position; a control circuit coupled to the first and second supports, wherein the control circuit is configured to selectively engage at least one gas charged hydraulic accumulator to one of the first support and the second support to thereby spring-load the unloading conveyor in the vertical or the horizontal direction (or both).

15 Claims, 2 Drawing Sheets

UNLOADING CONVEYOR SUSPENSION SYSTEM

FIELD OF THE INVENTION

The invention relates to agricultural harvester vehicles. More particularly, it relates to unloading conveyors for agricultural harvester vehicles. Even more particularly it relates to accumulators for unloading conveyor swing systems.

BACKGROUND OF THE INVENTION

Agricultural harvester vehicles have unloading conveyors that are configured to unload grain collected in the grain tank on the agricultural harvester vehicles and to deposit that grain into a vehicle that is traveling alongside the harvester vehicle.

Agricultural harvester vehicles commonly use an auger as an unloading conveyor. In this arrangement, a steel tube encloses a helical auger—an Archimedes screw—that rotates to convey grain from the grain tank to the vehicle traveling alongside the harvester vehicle. One problem with auger conveyors is the sliding contact between the grain and the conveyor itself. The grain slides along the bottom of the steel tube and slides along the steel flight of the auger. Augers are limited in their capacity. They must be operated at a relatively slow speed so as not to damage the grain which requires a relatively large diameter tube and helical auger if the unloading conveyors are to convey much grain.

As with all equipment, the capacity of agricultural harvester vehicles has been steadily increasing. This has occurred by increasing the speed of the harvester vehicle as it travels through the field, and also by increasing the width of the swath. The latter is provided by increasing the width of the harvesting head of the agricultural harvester vehicle.

These changes have pointed to inherent flaws in the existing auger conveyors. The linear speedup travel through auger conveyors is limited, thus to increase the conveyor throughput the diameter of an auger conveyor must be increased. Since the swath width is greater, however, the length of the auger must also be increased. This greater diameter and greater length are particularly problematic due to the high side load and great weight they add to the harvester vehicle. Furthermore, a larger auger must carry a larger weight of grain.

For this reason, more recent designs have incorporated a belt conveyor which can be operated at higher linear speeds than an auger conveyor thereby permitting it to be built lighter and smaller than a corresponding auger conveyor of the same capacity even though it is longer than a typical auger conveyor.

One problem with belted conveyors is due to their greater length, light weight, and small cross-section: as the harvester vehicle travels through the field pitching, rolling, and yawing it can exert large forces on the base of the conveyor and on the support members as it tries to force the conveyor to pitch, roll, and yaw to match the harvester vehicle's motion.

For this reason, the applicants propose herein a method of suspending the conveyor from the harvester vehicle that permits the harvester vehicle to pitch, roll, and yaw as it follows the ground in the agricultural field while isolating the conveyor from excessive force communicated to the conveyor from the harvester vehicle itself. The system described herein permits relative motion between the harvester vehicle and the conveyor so that the harvester vehicle cannot apply excessive force to the unloading conveyor.

In the past, other arrangements have been provided to prevent damage to the unloading conveyor when an external force is applied to the unloading conveyor, such as a post, pole, tree, building, or other fixed structure. Typically, this is to prevent damage in the event that the operator drives the harvester vehicle (or at least the unloading conveyor of the vehicle) into a fixed obstruction. These devices permit the unloading conveyor to rotate and/or translate with respect to the harvester vehicle when the harvester vehicle drives the unloading conveyor into a fixed obstruction. They are not intended or designed to permit pitching, rolling, or yawing of the harvester vehicle with respect to the unloading conveyor (i.e. to permit relative movement between the harvester vehicle and the unloading conveyor) during normal operations as the harvester vehicle travels through the field.

One arrangement is shown in U.S. Pat. No. 6,718,746 to Hettiger. In this patent, a forage harvester vehicle has a long unloading spout that is driven by a motor and gear arrangement. The gear extends around the circumference of the tubular unloading spout and the motor drives this gear to drive the spout in rotation with respect to the harvester vehicle. A non-return friction overload clutch 48 is provided in the motor drive train to permit the spout to be pushed to one side if the spout encounters an obstacle in the field. If the spout hits an obstacle, the friction clutch 48 will yield, permitting the spout to turn about its vertical axis with respect to the harvester vehicle even though the motor that drives the gear is stopped.

A similar arrangement is shown in EP 1092342 A1 to Holger in which a hydraulic motor drives a circumferential gear to rotate the spout about a vertical axis. It has a pressure limiting valve between the feed line or return line for the hydraulic motor and the leakage line. This arrangement is a hydraulic analog of the friction clutch of the previous example, using hydraulic leakage to permit the spout to move with respect to the harvester vehicle once some force is applied to the spout. Again, this arrangement operates when some external force contacts the spout, pushing it to one side, and thereby causing the pressure in the motor to increase above a limiting value.

U.S. Pat. No. 7,393,275 B2 illustrates another example in which an unloading auger can be folded backward when the unloading auger contacts an immovable object. In this arrangement, the folding-backwards breaks the grain auger at its base, disconnecting the grain auger and disabling it.

U.S. Pat. No. 3,670,913 discloses a "break back system" similar to the previous system. It includes a hinge joint where the grain auger can fold or "break". In addition, the auger has a support member that holds it up in the air that incorporates a breakaway mechanism 66. When the auger encounters an external object, this breakaway mechanism 66 disconnects completely from the harvester vehicle permitting the unloading auger to fold backwards with respect to the harvester vehicle.

In all of the above examples, a relief device operates when the unloading conveyor contacts some immovable object. The auger must either yield by folding backwards or be damaged. In all the cases, the force applied to the unloading conveyor must reach some threshold before a friction clutch, breakaway joint, or hydraulic pressure relief valve operates. They are designed to permit the unloading conveyor to survive when it accidentally contacts some object. In the case of the folding grain augers, this operation disables the unloading system. In each of the examples, the unloading system, when deflected, remains in a deflected and/or inoperable state until manually reset or reattached by the operator.

They are not configured to operate continuously to prevent the communication of excessive force from the harvester vehicle to the unloading conveyor as the harvester vehicle harvests in the field. It is an object of this invention to provide such a system.

SUMMARY OF THE INVENTION

In accordance with a first aspect of the Invention, a suspension system for an unloading conveyor of an agricultural harvester vehicle, comprising a first support configured to hold the unloading conveyor in a vertical unloading position; a second support configured to hold the unloading conveyor in a horizontal unloading position; and a control circuit coupled to the first and second supports, wherein the control circuit is configured to selectively engage at least one gas charged hydraulic accumulator to one of the first support and the second support to thereby spring-load the unloading conveyor in at least the vertical or the horizontal direction.

The second support may be a first hydraulic actuator, and the control circuit may be configured to selectively engage the at least one gas charged hydraulic accumulator to the first hydraulic actuator, thereby permitting the first hydraulic actuator to function together with the at least one gas charged hydraulic accumulator as a spring-loaded support for the unloading conveyor. The first support may be a second hydraulic actuator, and the control circuit may be configured to selectively engage the at least one gas charged hydraulic accumulator to the second hydraulic actuator, thereby permitting the second hydraulic actuator to function together with the at least one gas charged hydraulic accumulator as a spring-loaded support for the unloading conveyor. The agricultural harvester vehicle may include an operator cab from which the harvester vehicle is configured to be operated during normal harvesting operations in an agricultural field, and the control circuit may include at least one operator actuated device disposed in the operator cab that permits the operator to manually engage and disengage the at least one gas charged hydraulic accumulator to one of the first support in the second support during normal operations through the field. The control circuit may be configured to automatically engage the at least one gas charged hydraulic accumulator when the stress applied by the harvester vehicle to the unloading conveyor exceeds a first predetermined value. The control circuit may be configured to automatically disengage the at least one gas charged hydraulic accumulator when the stress applied by the harvester vehicle drops below a second predetermined value. The suspension system may further include at least one pressure sensor configured to indicate the stress applied by the harvester vehicle to the unloading conveyor. The suspension system may further include at least one accelerometer configured to indicate the stress applied by the harvester vehicle to the unloading conveyor. The unloading conveyor may include a first endless belt conveyor portion supported on a first frame. The unloading conveyor may include a second endless belt conveyor portion supported on a second frame that is slidably supported on the first frame and extendable therefrom.

In accordance with a second aspect of the Invention, a method of operating a suspension system for an unloading conveyor of a agricultural harvester vehicle in an agricultural field, is provided, including the steps of driving the harvester vehicle through the agricultural field from an operator station of the agricultural harvester vehicle; and from the operator cab, engaging at least a first gas charged hydraulic accumulator to a first hydraulic support of the unloading conveyor to thereby spring load the unloading conveyor for movement in at least one of a vertical and a horizontal direction.

The method may further include the step of, from the operator cab, engaging at least the second gas charged hydraulic accumulator to a second hydraulic support of the unloading conveyor to thereby spring load the unloading conveyor for movement in the other of a vertical and a horizontal direction. The step of engaging at least the first gas charged hydraulic accumulator may further include the step of automatically and periodically sensing a stress applied by the harvester vehicle to the unloading conveyor in at least one of the vertical and horizontal direction, and (responsive to the stress exceeding at predetermined value) automatically engaging the first gas charged hydraulic accumulator to the first hydraulic support of the unloading conveyor to thereby spring load the unloading conveyor for movement in the at least one direction. The at least one direction may be horizontal. The at least one direction may be vertical.

DESCRIPTION OF THE PREFERRED EMBODIMENT

Figure 1:
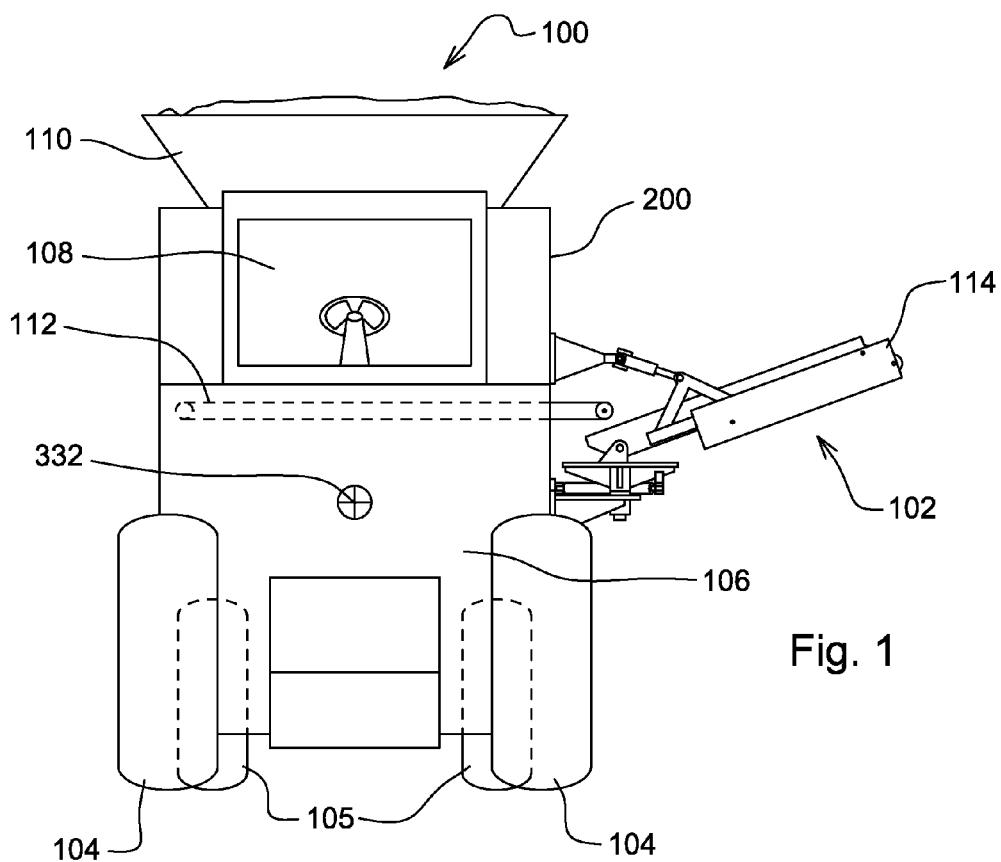
FIG. 1 is a front view of an agricultural harvester vehicle with an unloading conveyor.

In FIG. 1, an agricultural harvester vehicle 100 is shown including an unloading conveyor 102 that is pivotally coupled to a left side 200 of harvester vehicle 100.

Harvester vehicle 100 includes two front wheels 104 and two rear wheels 105 that support harvester vehicle 100 for movement over the ground. Wheels 104, 105 support chassis 106 on which an operator station 108 and a grain tank 110 are mounted.

A laterally extending endless belt cross conveyor 112 is disposed at the bottom of grain tank 110 to gather grain falling from the grain tank and carry it to the left side of the vehicle. Unloading conveyor 102 is pivotally coupled to the side of harvester vehicle 100 adjacent to the cross conveyor 112 to receive grain from cross conveyor 112 and convey the grain upwards through unloading conveyor 102 to an exit 114 of unloading conveyor 102. Grain leaving exit 114 of unloading conveyor 102 100 is projected into a vehicle such as a grain cart or truck (not shown) that is disposed alongside harvester vehicle 100.

Figure 2:
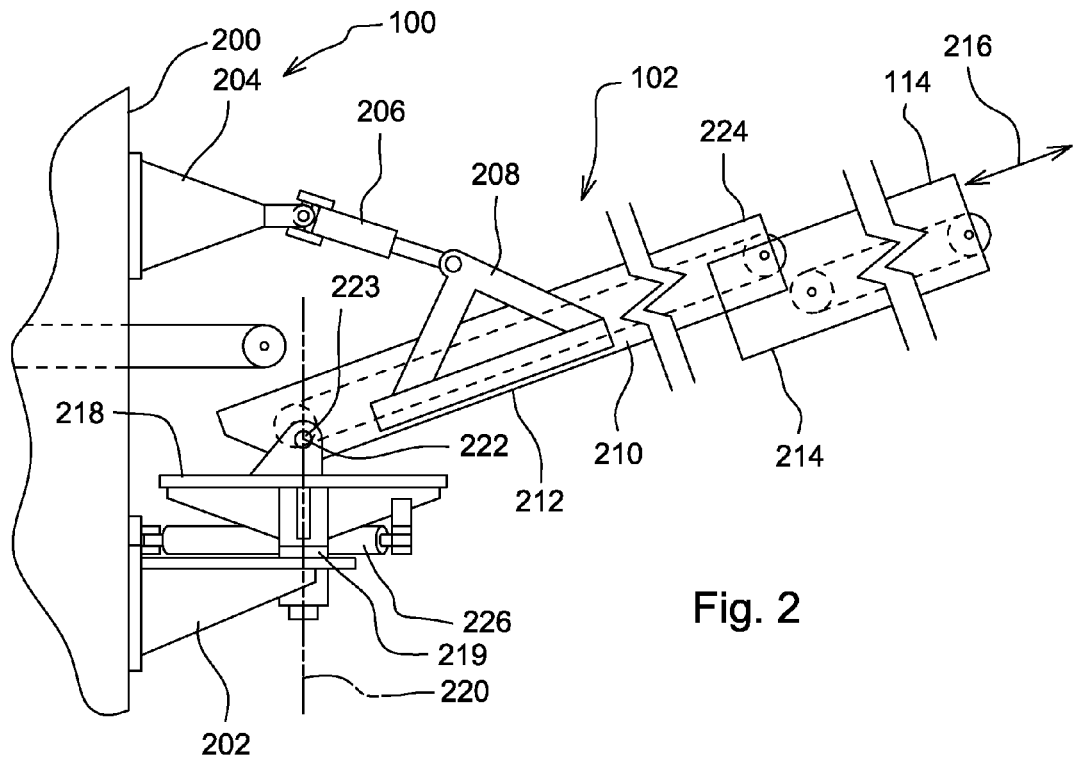
FIG. 2 is a fractional detail view of the unloading conveyor of FIG. 1.

Referring now to FIG. 2, a left side 200 of harvester vehicle 100 includes a first lower unloading conveyor support 202 and a second upper conveyor support 204 fixed thereto.

Upper unloading conveyor support 204 is coupled to a variable length support 206, here shown as a hydraulic actuator, and more preferably a hydraulic cylinder, which in turn is coupled to unloading conveyor 102, and in particular is coupled to a support bracket 208 attached to left and right elongate side members 210 (only one of which is shown) of a first conveyor 212 of the unloading conveyor 102. A second unloading conveyor 214 of unloading conveyor 102 is slidably supported on first conveyor 212 to extend and retract from first conveyor 212 in a direction generally parallel to the longitudinal extent of first conveyor 212, as indicated by arrow 216 in FIG. 2.

Lower unloading conveyor support 202 is fixed to the left side 200 of harvester vehicle 100, and supports a base 218 of first conveyor 212 for pivotal movement of base 218 about a pivot 219 that defines a vertical pivotal axis 220 extending upwards through lower unloading conveyor support 202. Base 218 is pivotally coupled to the left and right elongate side members 210 to pivot them about a pivot 223 that defines a generally horizontal axis 222. Thus, first conveyor 212 is permitted to rotate about vertical axis 220 and about horizontal axis 222 thereby permitting the remote end 224 of first conveyor 212 to move through and define a three-dimensional curved surface that extends generally vertically and horizontally.

First conveyor 212 is pivoted up and down about horizontal axis 222 by extending or retracting variable length support 206. In the preferred embodiment, variable length support 206 is a linear actuator, such as a hydraulic cylinder (shown here), lead screw, or other elongate device that can be selectively rapidly adjusted in length during normal operation of the harvester vehicle 100 in the field. First conveyor 212 is pivoted about vertical axis 220 by extending or retracting a variable length support 226, here shown as a hydraulic actuator, and more preferably a hydraulic cylinder, which is coupled to and between left side 200 of harvester vehicle 100 and base 218. Variable length support 226 is coupled to base 218 such that when support 226 extends and retracts, it rotates base 218 about vertical axis 220. Base 218 then rotates first conveyor 212 about vertical axis 220.

Figure 3:
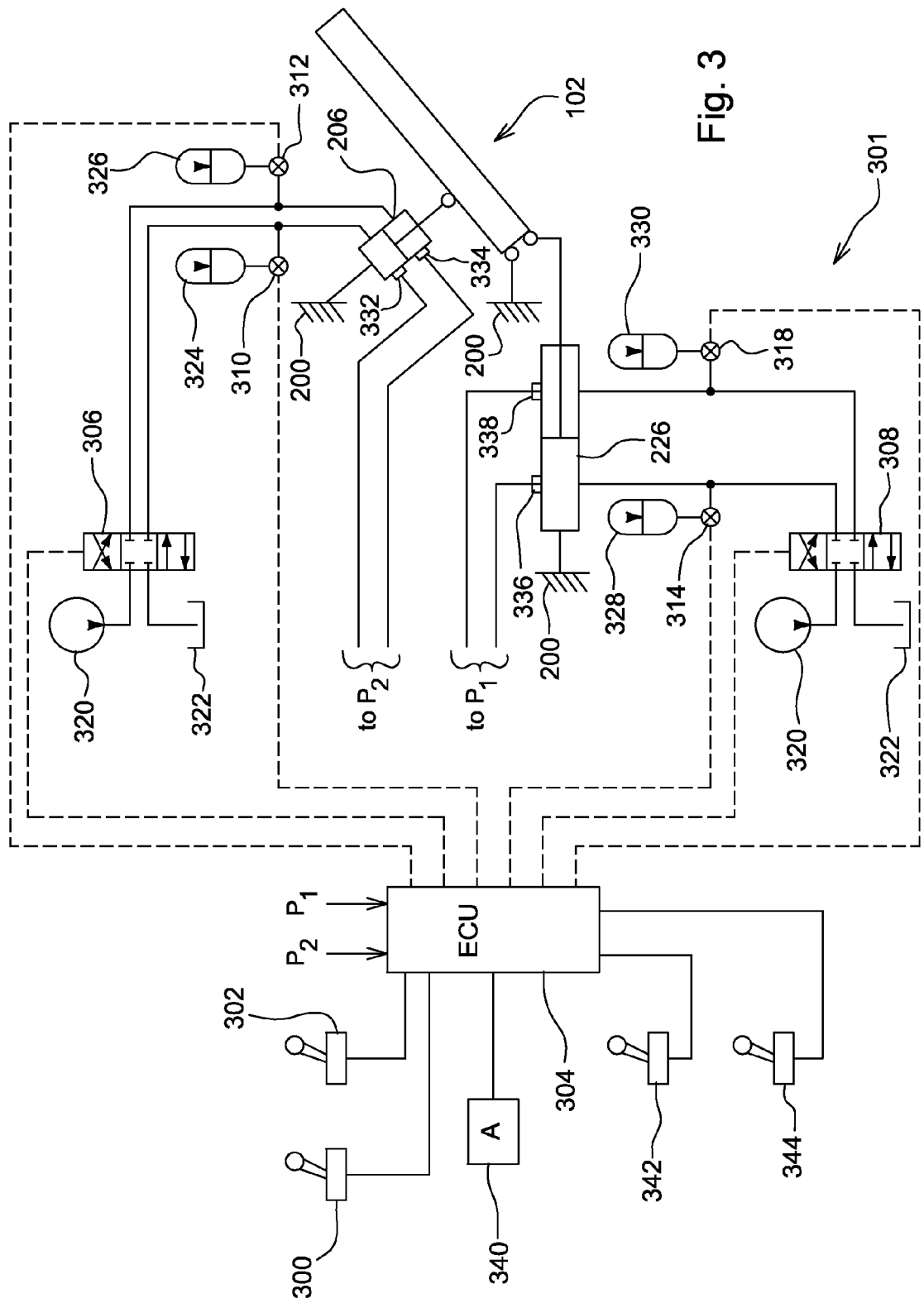
FIG. 3 is a schematic diagram of an electrohydraulic control system for controlling the position of the unloading conveyor with respect to the agricultural harvester vehicle.

Referring now to FIG. 3, a control circuit for controlling the position of unloading conveyor 102 includes operator input devices 300, 302; ECU 304; valves 306, 308, 310, 312, 314, and 318; source of hydraulic fluid under pressure 320; hydraulic reservoir 322; accumulators 324, 326, 328, 330; pressure sensors 332, 334, 336, 338; accelerometer 340; and switches 342, 344.

The operator can manipulate operator input devices 300, 302 (which are located at operator station 108) to control the vertical and horizontal positioning of unloading conveyor 102 with respect to harvester vehicle 100.

Operator input device 300 controls the swing position of unloading conveyor 102 by controlling the hydraulic fluid flow to variable length support 226. When operator input device 300 is manipulated by the operator in one direction, it causes hydraulic fluid to flow into variable length support 226 and extend it in length, thereby pivoting unloading conveyor 102 about vertical axis 220 (FIG. 2) in a clockwise direction (viewed from above) about vertical axis 220. When operator input device 300 is manipulated by the operator in the opposite direction, it causes hydraulic fluid to flow into variable length support 226 and reduce it in length, thereby pivoting unloading conveyor 102 about vertical axis 220 (FIG. 2) in a counterclockwise direction (viewed from above) about vertical axis 220.

Operator input device 302 controls the vertical position of unloading conveyor 102 by controlling the hydraulic fluid flow to variable length support 206. When operator input device 302 is manipulated by the operator in one direction, it causes hydraulic fluid to flow into variable length support 206 and extend it in length, thereby pivoting unloading conveyor 102 about horizontal axis 222, thereby lowering unloading conveyor 102. When operator input device 302 is manipulated by the operator in the other direction, it causes hydraulic fluid to flow into variable length support 206 and reduce it in length thereby pivoting unloading conveyor 102 about horizontal axis 222, thereby raising unloading conveyor 102.

Operator input devices 300, 302 are coupled to electronic control unit (ECU) 304 which is configured to receive signals from an accelerometer, pressure sensors, and operator input devices 300, 302, and to responsively signal conveyor lift valve 306, conveyor swing valve 308, conveyor lift accumulator valves 310, 312, and conveyor swing accumulator valves 314, 318.

ECU 304 comprises a digital microprocessor that is coupled to RAM, to ROM, and to valve driver circuits. The ROM includes memory locations that store digital instructions. The digital instructions are configured to command the digital microprocessor to perform all of the functions described herein. The RAM includes memory location used as transient working memory by the digital microprocessor to store working variables. The valve driver circuit is used by the digital microprocessor to convert digital values that indicate the degree of valve opening (said values being generated by the digital microprocessor) into corresponding analog signals, and to amplify those analog signals to levels sufficient to drive each of the valves to positions commanded by the digital microprocessor.

The conveyor lift valve 306 is coupled to the source of hydraulic fluid under pressure 320 and to the hydraulic reservoir 322. Conveyor lift valve 306 is configured to selectively direct hydraulic fluid under pressure to variable length support 206 to thereby extend or retract it depending upon the position of conveyor lift valve 306. ECU 304 is drivingly coupled to conveyor lift valve 306 to drive it to all of its commanded positions.

The conveyor swing valve 308 is similarly coupled to source 320 and reservoir 322. Conveyor swing valve 308 is configured to selectively direct hydraulic fluid under pressure to variable length support 226 to thereby extend it or retract it depending upon the position of conveyor swing valve 306. ECU 304 is drivingly coupled to conveyor swing valve 308 to drive it to all of its commanded positions.

ECU 304 is also coupled to and drives conveyor lift accumulator valves 310, 312, which responsively connect and disconnect hydraulic accumulators 324, 326, respectively, to the extend and retract ports, respectively, of variable length support 206.

When ECU 304 opens conveyor lift accumulator valves 310, 312, hydraulic accumulators 324, 326 are coupled to the hydraulic lines of variable length support 206. Accumulators 324, 326 are gas charged accumulators that act as springs in combination with variable length support 206 when in fluid communication with variable length support 206.

When accumulators 324, 326 are coupled to variable length support 206 and unloading conveyor 102 is pivoted outward to the left side of harvester vehicle 100, the harvester vehicle 100 can roll about its longitudinal axis 332 (FIG. 1) as it encounters rough terrain without communicating extreme forces to unloading conveyor 102 through variable length support 206. This serves to isolate unloading conveyor 102 from high forces due to vehicle 100 movement that tend to jerk conveyor 102 upward or downward at exit 114. This permits unloading conveyor 102 to be built of lighter materials, and to be built significantly longer. It also tends to keep exit 114 in the same position (e.g. for unloading into a vehicle traveling alongside the harvester vehicle 100). In this manner, unloading conveyor 102 can be made narrower and longer with a smaller belt that is run at greater speed, yet insure that even severe rolling motions of harvester vehicle 100 will not cause this smaller (in cross-section) conveyor to break. This also permits the use of lighter metals in constructing unloading conveyor 102, such as aluminum.

ECU 304 is also coupled to and drives conveyor swing accumulator valves 314, 318, which responsively connect and disconnect hydraulic accumulators 328, 330, respectively, to the extend and retract ports, respectively, of variable length support 226.

When accumulators 328, 330 are coupled to variable length support 226 and unloading conveyor 102 is pivoted outward to the left side of harvester vehicle 100, the harvester vehicle 100 can steer to the left or right (i.e. yaw), or accelerate or decelerate without communicating extreme forces to unloading conveyor 102 through variable length support 226. This serves to isolate unloading conveyor 102 from high forces that tend to jerk the conveyor forward or rearward as the harvester vehicle rapidly accelerates or decelerates. If the harvester vehicle accelerates or decelerates quickly when accumulators 328, 330 are not coupled to variable length support 226, then variable length support 226 acts as a rigid member and communicates the high forces of acceleration or deceleration directly to the base of unloading conveyor 102.

On the other hand, when accumulators 328, 330 are coupled to the variable length support 226, unloading conveyor 102 can pivot backwards in a spring-loaded fashion about vertical axis 220 when the harvester vehicle accelerates in a forward direction and can pivot forward about vertical axis 220 in a spring-loaded fashion when the harvester vehicle decelerates in a forward direction. This ability to pivot with respect to the harvester vehicle reduces the forces applied by the harvester vehicle to the unloading conveyor in a horizontal plane.

ECU 304 is coupled to pressure sensors 332, 334, 336, 338 that indicate the pressure in variable length supports 226, 206. These pressures are proportional to the forces exerted on unloading conveyor 102 by variable length supports 226, 206. Pressure sensors 332, 336 indicate the pressure at the extend port of variable length supports 206, 226, respectively. Pressure sensors 334, 338 indicate the pressure at the retract port of variable length supports 206, 226, respectively. The pressure in variable length supports 226, 206 is proportional to the force applied by the harvester vehicle to the base of the unloading conveyor 102.

To control the force applied by the harvester vehicle 100 to the unloading conveyor, ECU 304 is configured to monitor pressure sensors 332, 334, 336, 338 and to selectively open and close the conveyor lift accumulator valves and the conveyor swing accumulator valves.

In a first mode of operation, ECU 304 is configured to monitor the pressure sensors 336, 338 for the variable length support 226, and to open the accumulator valves 314, 318 for variable length support 226 when the pressure indicated by said sensors reaches a first predetermined threshold.

In a second mode of operation, ECU 304 is configured to monitor the pressure sensors 332,334 for the variable length support 206, and to open the accumulator valves 310, 312 for variable length support 206 when the pressure indicated by said sensors reaches a second predetermined threshold.

In a third mode of operation, ECU 304 is configured to close the accumulator valves 310, 312 or 314, 318 for the variable length supports 226 or 206 when the pressure indicated by pressure sensors 332, 334, or 336, 338 (respectively) falls below a predetermined value, or alternatively falls below a predetermined value for a predetermined amount of time.

ECU 304 is also coupled to accelerometer 340, which is mounted on harvester vehicle 100 and provides a signal indicative of the acceleration of harvester vehicle 100. Accelerometer 340 is preferably a multi-axis accelerometer and generates a plurality of signals, preferably six signals in which each signal indicates an acceleration in one of 3 orthogonal directions and about one of 3 orthogonal axes. Wherein the axes are respectively a first vertical axis, a second axis which is horizontal and generally parallel to the direction of travel of the harvester vehicle, and a third transverse axis orthogonal to the first two axes.

This signal or signals are communicated the ECU 304, which is configured to calculate the forces applied by harvester vehicle 100 to unloading conveyor 102 using these acceleration signals, and to determine, based on these acceleration signals, which of the conveyor lift accumulator valves and the conveyor swing accumulator valves should be opened in order to prevent excessive forces from being applied to the unloading conveyor and to open these valves.

In another mode of operation, ECU 304 is configured to monitor the accelerometer 340, and to open the accumulator valves 310,312 for variable length support 206 when the acceleration indicated by the accelerometer reaches a predetermined threshold.

In another mode of operation, ECU 304 is configured to monitor the linear acceleration of the harvester vehicle in a generally vertical direction, or the rotational acceleration of the harvester vehicle about a generally fore-and-aft horizontal axis that are indicated by the accelerometer signals, or both, and to open conveyor lift accumulator valves 310, 312 when this acceleration or accelerations reach a predetermined threshold.

In yet another mode of operation, ECU 304 is configured to monitor the accelerometer 340 and open the accumulator valves 314,318 for variable length support 226 when the acceleration indicated by the accelerometer 340 reaches a predetermined threshold.

In yet another mode of operation, ECU 304 is configured to monitor the linear acceleration of the harvester vehicle in a generally horizontal fore-and-aft direction or the rotational acceleration of the harvester vehicle about a vertical axis, or both, and open conveyor lift accumulator valves 314, 318 when this acceleration of accelerations reach a predetermined threshold.

The acceleration signals provided by accelerometer 340 and the pressure signals provided by the pressure sensors 332, 334, 336, 338 indicate the level of stress that will be applied by the harvester vehicle 100 to the base of the unloading conveyor 102 and to the region of the unloading conveyor where the support bracket 208 is attached. By monitoring these signals, ECU 304 can determine the magnitude of the forces to be applied, and to compensate or reduce these forces by coupling the accumulators to the variable length supports 226, 206, whichever one will be applying excessive forces to the unloading conveyor 102.

Alternative devices can also be used to indicate the level of stress applied by the harvester vehicle to the base of the unloading conveyor 102. For example, strain gauges may be located on conveyor 102 or harvester vehicle 100 in appropriate locations to indicate the stress.

In another mode of operation, ECU 304 is configured to respond to switch 342 (which is disposed inside the operating cab and is coupled to ECU 304) to open conveyor lift accumulator valves 310, 312. Switch 342 is preferably a multiposition switch providing several modes of operation.

When the operator manipulates switch 342 to a first position, ECU 304 is configured to respond to the switch signal generated thereby by opening valves 310, 312, thereby fluidly coupling accumulators 324, 326 to the hydraulic circuit and providing continuous spring loading of variable length support 206 regardless of the field conditions, the accelerometer signals and the pressure sensor signals.

When the operator manipulates switch 342 to a second position, ECU 304 is configured to respond to the switch signal generated thereby by closing valves 310, 312, thereby disconnecting accumulators 324, 326 from the hydraulic circuit, regardless of the field conditions, the accelerometer signals and the pressure sensor signals.

When the operator manipulates switch 342 to a third position, ECU 304 is configured to respond to the switch signal generated thereby by controlling the valve opening based on the stress applied to the unloading conveyor 102 by harvester vehicle 100 in any of the modes described above in which the pressure sensor signals and/or accelerometer signals are used to determine accumulator valve opening and closing.

In another mode of operation, ECU 304 is configured to respond to switch 344 (which is disposed inside the operating cab and is coupled to ECU 304) to open conveyor swing accumulator valves 314, 318. Switch 344 is preferably a multiposition switch providing several modes of operation.

When the operator manipulates switch 342 to a first position, ECU 304 is configured to respond to the switch signal generated thereby by opening valves 314, 318, thereby fluidly coupling accumulators 328, 330 to the hydraulic circuit and providing continuous spring loading of variable length support 226 regardless of the field conditions, the accelerometer signals and the pressure sensor signals.

When the operator manipulates switch 344 to a second position, ECU 304 is configured to respond to the switch signal generated thereby by closing valves 314 318, thereby disconnecting accumulators 328, 330 from the hydraulic circuit, regardless of the field conditions, the accelerometer signals and the pressure sensor signals.

When the operator manipulates switch 344 to a third position, ECU 304 is configured to respond to the switch signal generated thereby by controlling the valve opening based on the stress applied to the unloading conveyor 102 by harvester vehicle 100 in any of the modes described above in which the pressure sensor signals and/or accelerometer signals are used to determine accumulator valve opening and closing.

Switches 342, 344 permit the operator to override the automatic engagement and disengagement of the accumulators based on stress to either engage the accumulators or disengage the accumulators as desired. Furthermore, the operator can override the automatic engagement at disengagement of the accumulators that spring load vertical movement or the accumulators that spring load horizontal movement, or both.

If, for example, the operator knows the harvester vehicle 100 is operating on very smooth ground and wishes to hold the unloading conveyor 102 in position very accurately, the operator can disengage the accumulators while traveling over this ground and know that the unloading conveyor 102 will be held in a very precise position with respect to harvester vehicle 100 during the unloading process.

Alternatively, if the operator knows he is approaching an extremely rough portion of ground, he can automatically engage the accumulators before the harvester vehicle 100 reaches this ground and permit the unloading conveyor 102 to move in a spring-loaded fashion about its vertical and horizontal axes immediately upon reaching the rough portion of ground rather than waiting until the stress applied by the harvester vehicle to the unloading conveyor (indicated by the pressure sensors or the accelerometer) reaches a predetermined level or threshold.

Furthermore, the operator can disengage the accumulators before pivoting the unloading conveyor 102 rearward about vertical axis 222 into a storage position, thereby preventing the unloading conveyor from moving into its front-to-rear oriented storage position with the accumulator still coupled to the circuit. This prevents the unloading conveyor 102 from bouncing up and down about its horizontal axis 222 or left to right about its vertical axis 220 as it is being folded into its storage position. This prevents damage to unloading conveyor 102 and harvester vehicle 100 during the storage process.

Having described the preferred embodiment, it will become apparent that various modifications can be made without departing from the scope of the invention as defined in the accompanying claims.

The invention claimed is:

1. A suspension system for an unloading conveyor of an agricultural harvester vehicle, the conveyor having one end mounted to the vehicle for permitting the conveyor to be pivoted about a vertical axis among selected horizontal unloading positions and to be pivoted about a horizontal axis among selected vertical unloading positions, comprising:
   a first support defined by a first variable length hydraulic actuator mounted for selectively moving the conveyor about said horizontal axis to, and for holding the unloading conveyor in a selected vertical unloading position;
   a second support defined by a second variable length hydraulic actuator mounted for selectively moving the conveyor about said vertical axis to, and for holding the unloading conveyor in a selected horizontal unloading position; and
   a control circuit coupled to the first and second supports, wherein the control circuit is configured for selectively individually effecting a change in the length of the first and second supports and for selectively coupling at least one gas charged hydraulic accumulator to, or decoupling said at least one gas charged hydraulic accumulator from, one of the first support and the second support to thereby spring-load or remove spring-loading from the unloading conveyor in at least the vertical or the horizontal direction.

2. The suspension system of claim 1, wherein the first support is a first hydraulic cylinder, and the control circuit being configured to selectively couple the at least one gas charged hydraulic accumulator and a second gas charged hydraulic accumulator respectively to first and second ends of the hydraulic, thereby permitting the first hydraulic cylinder to function together with the at least one and second gas charged hydraulic accumulators as a spring-loaded support for the unloading conveyor in the vertical direction.

3. The suspension system of claim 1, wherein the second support is a second hydraulic cylinder, and the control circuit is configured to selectively couple the at least one gas charged hydraulic accumulator and a second gas charged hydraulic accumulator to opposite ends of the second hydraulic cylinder, thereby permitting the second hydraulic actuator to function together with the at least one and second gas charged hydraulic accumulators as a spring-loaded support for the unloading conveyor in the horizontal direction.

4. The suspension system of claim 1, wherein the unloading conveyor comprises a first endless belt conveyor portion supported on a first frame.

5. The suspension system of claim 4, wherein the unloading conveyor comprises a second endless belt conveyor portion supported on a second frame that is slidably supported on the first frame and extendable therefrom.

6. A method of operating a suspension system for an unloading conveyor of an agricultural harvester vehicle in an agricultural field, the unloading conveyor being mounted for pivoting horizontally and vertically about one end, with first and second variable length supports respectively defined by first and second hydraulic actuators respectively coupled for effecting horizontal and vertical movements of the unloading conveyor, comprising the steps of:
   driving the harvester vehicle through the agricultural field from an operator station of the agricultural harvester vehicle; and from the operator cab, selectively coupling or decoupling at least a first gas charged hydraulic accumulator to or from one of said first and second hydraulic actuators of the unloading conveyor to thereby effect or disable a spring load acting on the unloading conveyor for movement in at least one of a vertical and a horizontal direction.

7. A method of operating a suspension system for an unloading conveyor of an agricultural harvester vehicle in an agricultural field, comprising the steps of:
    driving the harvester vehicle through the agricultural field from an operator station of the agricultural harvester vehicle; and
    from the operator cab, engaging at least a first gas charged hydraulic accumulator to a first hydraulic support of the unloading conveyor to thereby spring load the unloading conveyor for movement in at least one of a vertical and a horizontal direction, further comprising the step of:
    from the operator cab, engaging at least the second gas charged hydraulic accumulator to a second hydraulic support of the unloading conveyor to thereby spring load the unloading conveyor for movement in the other of a vertical and a horizontal direction.

8. A method of operating a suspension system for an unloading conveyor of an agricultural harvester vehicle in an agricultural field, comprising the steps of:
    driving the harvester vehicle through the agricultural field from an operator station of the agricultural harvester vehicle; and
    from the operator cab, engaging at least a first gas charged hydraulic accumulator to a first hydraulic support of the unloading conveyor to thereby spring load the unloading conveyor for movement in at least one of a vertical and a horizontal direction, wherein the step of engaging at least the first gas charged hydraulic accumulator includes the step of:
    automatically and periodically sensing a stress applied by the harvester vehicle to the unloading conveyor in at least one of the vertical and horizontal direction, and
    responsive to the stress exceeding at predetermined value, automatically engaging the first gas charged hydraulic accumulator to the first hydraulic support of the unloading conveyor to thereby spring load the unloading conveyor for movement in the at least one direction.

9. The method of claim 8, wherein the at least one direction is horizontal.

10. The method of claim 8, wherein the at least one direction is vertical.

11. A suspension system for an unloading conveyor of an agricultural harvester vehicle, comprising:
    a first support configured to position and hold the unloading conveyor in a vertical unloading position;
    a second support configured to position and hold the unloading conveyor in a horizontal unloading position;
    a control circuit coupled to the first and second supports, wherein the control circuit is configured to selectively engage at least one gas charged hydraulic accumulator to one of the first support and the second support to thereby spring-load the unloading conveyor in at least the vertical or the horizontal direction, wherein the agricultural harvester vehicle includes an operator cab from which the harvester vehicle is configured to be operated during normal harvesting operations in an agricultural field, and wherein the control circuit includes at least one operator actuated device disposed in the operator cab that permits the operator to manually engage and disengage the at least one gas charged hydraulic accumulator to one of the first support and the second support during normal operations through the field.

12. A suspension system for an unloading conveyor of an agricultural harvester vehicle comprising:
    a first support configured to position and hold the unloading conveyor in a vertical unloading position;
    a second support configured to position and hold the unloading conveyor in a horizontal unloading position; and
    a control circuit coupled to the first and second supports, wherein the control circuit is configured to selectively engage at least one gas charged hydraulic accumulator to one of the first support and the second support to thereby spring-load the unloading conveyor in at least the vertical or the horizontal direction, wherein the control circuit is configured to automatically engage the at least one gas charged hydraulic accumulator when the stress applied by the harvester vehicle to the unloading conveyor exceeds a first predetermined value.

13. The suspension system of claim 12, wherein the control circuit is configured to automatically disengage the at least one gas charged hydraulic accumulator when the stress applied by the harvester vehicle drops below a second predetermined value.

14. The suspension system of claim 12, further comprising at least one pressure sensor configured to indicate the stress applied by the harvester vehicle to the unloading conveyor.

15. The suspension system of claim 12, further comprising at least one accelerometer configured to indicate the stress applied by the harvester vehicle to the unloading conveyor.

* * * * *